United States Patent [19]

Kashiwagi

[11] Patent Number: 4,498,243
[45] Date of Patent: Feb. 12, 1985

[54] MOTOR VEHICLE CENTERING SYSTEM
[75] Inventor: Hiroo Kashiwagi, Aichi, Japan
[73] Assignee: Toyota Jidosha Kabushiki Kaisha, Aichi, Japan
[21] Appl. No.: 459,267
[22] Filed: Jan. 19, 1983
[30] Foreign Application Priority Data Jan. 22, 1982 [JP] Japan ................ 57-7703[U]

[51] Int. Cl.³ .................................... G01B 5/255
[52] U.S. Cl. ........................ 33/203.12; 33/180 AT
[58] Field of Search ........ 33/180 AT, 181 AT, 203.12, 33/203.14; 211/23; 248/352

[56] References Cited

U.S. PATENT DOCUMENTS

| 1,717,131 | 6/1929 | Weaver | 33/203.14 |
| 2,025,051 | 12/1935 | Haucke | 33/203.12 |
| 2,758,385 | 8/1956 | Martin | 33/203.12 |
| 2,821,790 | 2/1958 | Retherford | 33/203.12 |
| 2,962,980 | 12/1960 | Carrigan | 33/203.12 |
| 3,137,076 | 6/1964 | Hurst | 33/203.12 |
| 3,458,013 | 7/1969 | Haynes | 33/203.12 |

Primary Examiner—Richard R. Stearns
Attorney, Agent, or Firm—Finnegan, Henderson, Farabow, Garrett & Dunner

[57] ABSTRACT

A motor vehicle centering system includes a pair of first tread-boards which are laterally movable and extend parallel to a center line between the tread-boards on both sides of the center line. The center line coincides, for example, with a center line of a toe-angle inspecting apparatus. A pair of wheel guides are provided on both sides of the center line symmetrically relative to the center line to push the wheels of a motor vehicle on the first tread-boards and move the motor vehicle so that the longitudinal center line of the motor vehicle coincides with the above center line. The wheel guides are provided with a link means for maintaining the wheel guide to be symmetric relative to the center line between the tread-boards, and are driven by a driving means to push the wheels of the motor vehicle.

9 Claims, 4 Drawing Figures

MOTOR VEHICLE CENTERING SYSTEM

BACKGROUND OF THE INVENTION

1. Field of the Invention

The present invention relates to a motor vehicle centering system for centering a motor vehicle with pairs of wheels, particularly to a system for centering a motor vehicle relative to a toe-angle inspecting apparatus when the motor vehicle is introduced to the toe-angle inspecting apparatus.

2. Brief Description of Prior Art

Formerly, for centering the motor vehicle with pairs of wheels relative to the toe-angle inspecting apparatus, a guide was fixedly provided in front of the toe-angle inspecting apparatus, along which the motor vehicle is introduced to the toe-angle inspecting apparatus. Such a fixed guide can be applied only for motor vehicles with a predetermined tread width and a predetermined distance between wheels. Therefore, the guide is inapplicable for a motor vehicle manufacturing line wherein motor vehicles with various tread widths or various distances between wheels are manufactured.

SUMMARY OF THE INVENTION

The object of the present invention is to provide a motor vehicle centering system applicable for a motor vehicle manufacturing line wherein motor vehicles with various treads of wheels and/or various lateral distances of wheels are manufactured.

According to the present invention, a motor vehicle centering system includes a pair of first tread-boards which are laterally movable and extend parallel to a center line between the tread-boards on both sides of the center line. The center line coincides, for example, with the center line of a toe-angle inspecting apparatus. A pair of wheel guides are provided on both sides of the center line symmetrically relative to the center line to push the wheels of a motor vehicle on the first tread-boards and move the motor vehicle so that the longitudinal center line of the motor vehicle coincides with the above center line. The wheel guides are provided with a link means for maintaining the wheel guides symmetric relative to the center line between the tread-boards and are driven by a driving means to push the wheels of the motor vehicle.

BRIEF DESCRIPTION DRAWINGS

DETAILED DESCRIPTION OF PREFERRED EMBODIMENT

Figure 1:
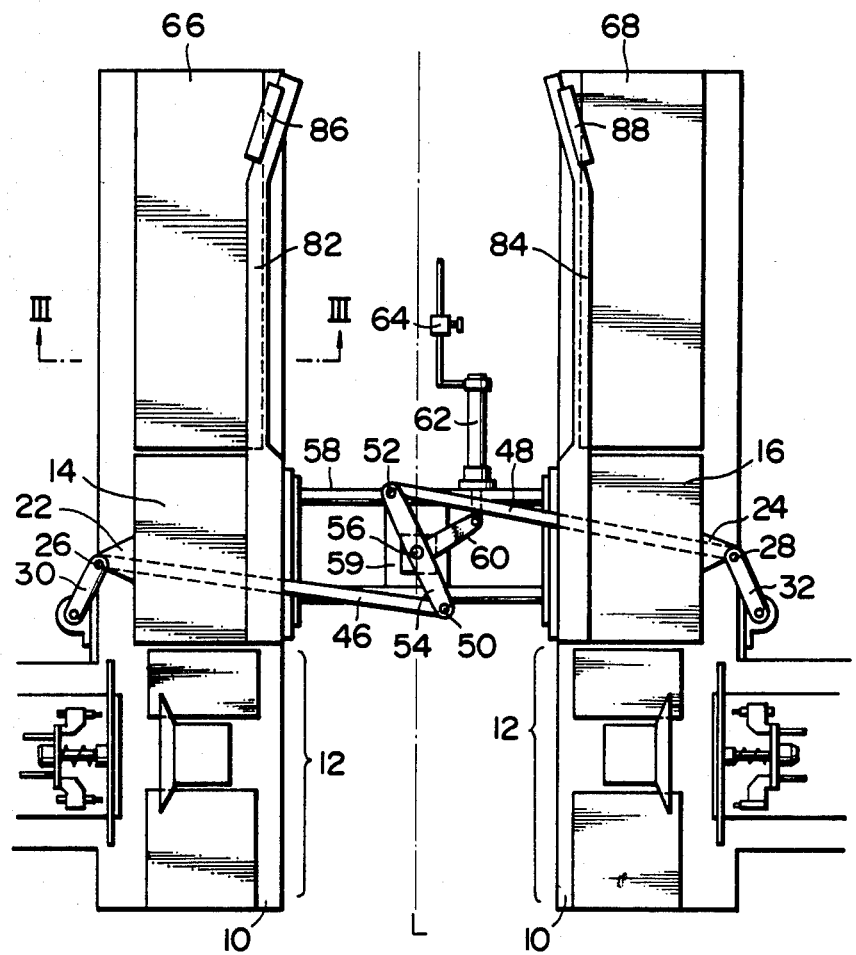
FIG. 1 is a plan view showing an embodiment of the present invention.

As shown in FIG. 1, a motor vehicle centering system is positioned in front of a toe-angle inspecting apparatus 12, and the motor vehicle centering system and the toe-angle inspecting apparatus 12 are supported by a frame 10. The frame 10 extends along a center line L coincident with the center line of the toe-angle inspecting apparatus 12 which is constructed to be symmetric relative to the center line L.

The motor vehicle centering system includes a pair of first tread-boards 66 and 68 and a pair of second tread-boards 14 and 16, which are mounted on the frame 10 laterally movably, i.e., movably horizontally and perpendicularly to the center line L. The first and second tread-boards 66 and 68 are separated laterally by distances substantially corresponding to a lateral distance between the wheels of the motor vehicle. The first tread-boards 66 and 68 are positioned to extend from the end of the frame 10 for introducing the motor vehicle to the middle portion of the frame 10. The toe-angle inspecting apparatus 12 is positioned at the end portion of frame 10 opposite the end for introducing the motor vehicle. A second tread-boards 14 and 16 are positioned between the first tread-boards 66 and 68 and the toe-angle inspecting apparatus 12 and are substantially in line with the first tread-boards. The first tread-boards 66 and 68 have a width wider than width of the wheels so as to support the motor vehicle thereon. The second tread boards 14 and 16 have a width substantially equal to the width of the first tread-boards 66 and 68 but are not as long as the first tread-boards 66 and 68. A pair of wheel guides 82 and 84 extends from the second tread-boards toward and along the first tread-boards, and are positioned symmetrically relative to the center line L. Each of the wheel guides is fixed to an individual one of the second tread-boards so as to be cantilevered from its respective second tread-board. The wheel guides have introducing portions, one introducing portion 86 for the wheel guide 82 and one introducing portion 88 for the wheel guide 84. Each introducing portion is located adjacent the end of the frame 10 for introducing the motor vehicle, and the introducing portions project laterally inwardly and toward the motor vehicle ready for being introduced onto the first tread-boards 66 and 68.

Figure 2:
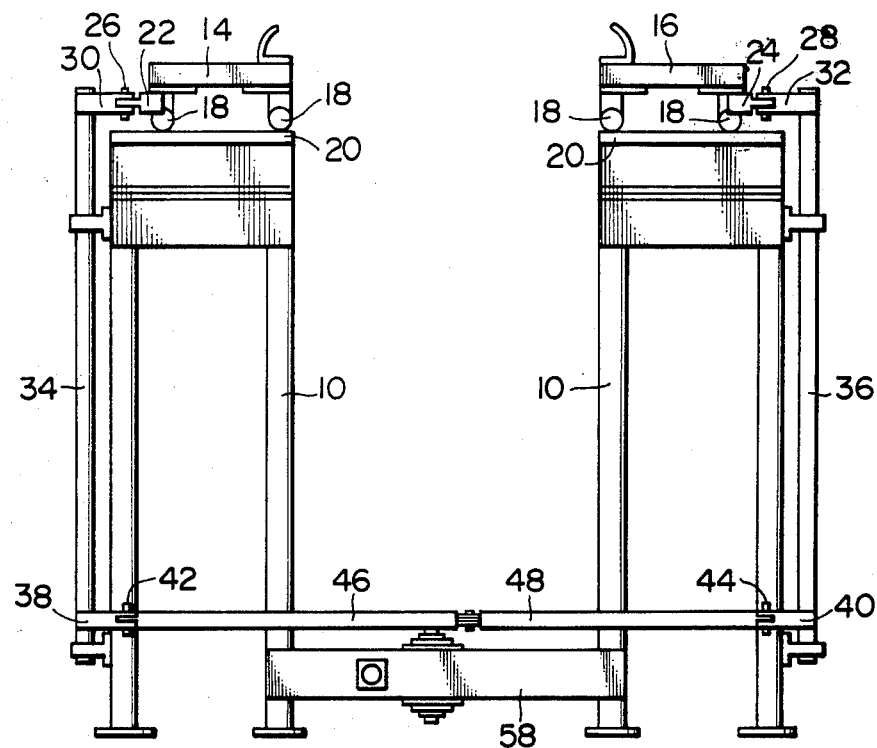
FIG. 2 is a elevation view of the embodiment shown in FIG. 1.

As shown in FIG. 2, the second tread-boards 14 and 16 have rollers 18 which engage rotatably with rails 20 laid laterally on the frame 10. Thus, the second tread-boards 14 and 16 are laterally movable and are guided through rollers 18 by the rails 20.

As shown in FIGS. 1 and 2, brackets 22 and 24 are projected laterally outwardly from the under surface of the second tread-boards 14 and 16. A pair of equal length horizontal links 30 and 32 have their first ends pivotably connected to the brackets 22 and 24 by pins 26 and 28, respectively. The other ends of the links 30 and 32 are fixed to upper ends of rotatable shafts 34 and 36, which extend vertically. A pair of equal-length horizontal links 38 and 40 have their first ends fixedly connected to the lower ends of the shafts 34 and 36, respectively. The other ends of the links 38 and 40 are pivotably connected to the first ends of horizontal links 46 and 48 by pins 42 and 44, respectively. The other ends of the links 46 and 48 are pivotably connected by pins 50 and 52 to opposite ends of a horizontal center link 54, which is pivotably mounted at its middle point to the frame 10 on a vertical axis intersecting the center line L. The center link 54 is fixed to a vertical shaft 56 located at the center line L, which is rotatably supported by a middle portion 59 of a connecting plate 58, which is fixed to the frame 10. The links 30, 32, 38, 40, 46, 48, and 54 define a symmetrical link means connecting the second tread-boards 14 and 16, so that the second tread-boards 14 and 16 are maintained symmetric relative to the center line L. Therefore, the second tread-boards 14 and 16 move symmetrically in the lateral direction.

A horizontal arm 60 is fixedly attached to the middle portion of the center link 54. A free end of the arm 60 is pivotably connected to the free end of an output shaft of an air cylinder 62. The air cylinder 62 is connected to an air source of a constant pressure to bias the second tread-boards 14 and 16 laterally outwardly through the link means.

Figure 3:
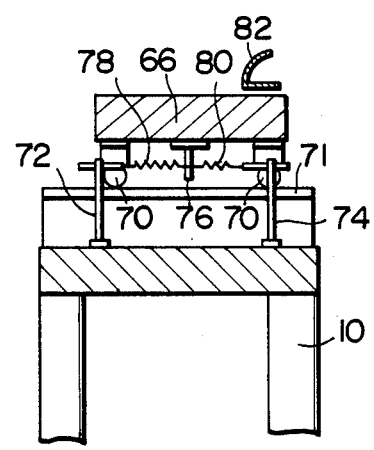
FIG. 3 is a sectional view along a line III—III in FIG. 1.

As shown in FIG. 3 illustrating only one of the tread-boards in detail, the first tread-boards 66 and 68 have rollers 70 which engage rotatably with rails 71 laid laterally on the frame 10. Thus, the first tread-boards 66 and 68 are laterally movable and are guided through rollers 70 by the rails 71. A pair of support plates 72 and 74 stand up from the frame 10 toward the first tread board, while a support plate 76 projects downwardly from the under surface of each of the first tread-boards 66 and 68 between the support plates 72 and 74. Return springs 78 and 80 are stretched between the plates 72 and 76, and between the plates 74 and 76, respectively. The return springs 78 and 80 bias the first tread-boards 66 and 68 toward their original lateral positions and return the first tread-boards 66 and 68 to their original positions after, as described below, an off-center motor vehicle causes a deviation of the first tread-boards 66 and 68 from the original positions. The first tread-board 68 is constructed the same as the first tread-board 66 illustrated in FIG. 3.

Figure 4:
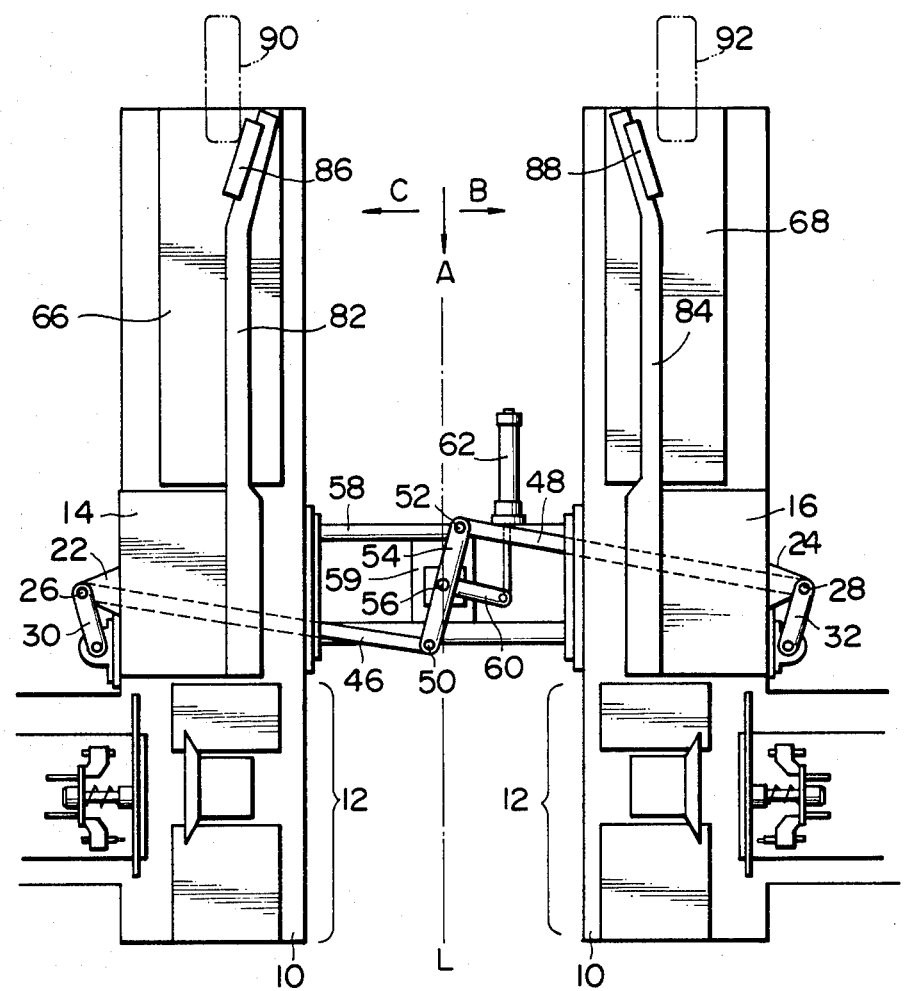
FIG. 4 is a plan view showing the embodiment in operation.

The operation of the motor vehicle centering system is hereafter explained according to FIG. 4. When a motor vehicle with pair of leading wheels 90 and 92, whose center line deviates from the center line L toward a direction shown by an arrow B, is introduced toward a direction A onto the first tread-boards 66 and 68, the leading wheel 90 introduced onto the first tread-boards 66 touches the laterally outward surface of the introducing portion 86. The introducing portions 86 and 88 are so positioned that they are inserted between the leading wheels of motor vehicles of various types that might be introduced onto the first tread-boards, even with a deviation from the center line L to some extent. As the motor vehicle is further advanced, the leading wheel 90 pushes the wheel guide 82 laterally inwardly against the biasing force of the air cylinder 62. At the same time and because of the link means described above, the wheel guide 84 moves laterally inwardly. When the motor vehicle is further advanced and each of the leading wheels is completely onto the first tread-board, the wheel guide 82 pushes the leading wheel 90 laterally outwardly until the wheel guide 84 touches the leading wheel 92. During this time, the first tread-board 66 moves laterally outwardly, i.e., in the direction C, together with the leading wheel 90, and the first tread-board 68 moves laterally inwardly together with the leading wheel 92 until the center line of the motor vehicle coincides with the center line L. On this centering, the motor vehicle should as a whole move laterally. Therefore, the rear wheels of the motor vehicle are supported such as by a laterally movable table or by a centering system the same as the present invention. However, it will be appreciated that the first tread-boards 66 and 68 may be of sufficient length that the rear wheels will be on the first tread-boards together with the leading wheels, whereby the laterally movable table can be omitted.

As described above, the motor vehicle centering system of the present invention is useful for centering motor vehicles with various tread widths and/or various lateral distances between wheels. Therefore, the centering system is applicable for a motor vehicle manufacturing line wherein motor vehicles with various treads widths and/or various lateral distances between wheels are manufactured.

What is claimed is:

1. A motor vehicle centering system for centering a motor vehicle having pairs of wheels, comprising:
   a. a stationary frame;
   b. a pair of first tread-boards extending along and on both sides of a center line between said first tread-boards, each of said first tread-boards having a width wider than the width of said wheels, said first tread-boards separated laterally by a distance corresponding to the approximate lateral distance between said wheels, and each of said first tread-boards being laterally movably mounted on said frame;
   c. a pair of wheel guides symmetrically positioned on opposite sides of said center line for moving said wheels which contact said first tread-boards into positions symmetrical relative to the center line, each of said wheel guides being laterally movably mounted on said frame;
   d. link means mounted on said frame for maintaining said pair of wheel guides symmetrical relative to said center line and allowing said wheel guides to move symmetrically laterally; and
   e. driving means for driving said link means to move said wheel guides and push wheels in contact with said first tread-boards to positions symmetrical relative to said center line.

2. The motor vehicle centering system as claimed in claim 1, wherein said wheel guides are biased laterally outwardly by said driving means, and each of said wheel guides includes an introducing portion located at the first ends of said first tread-boards where said motor vehicle is introduced, and said introducing portion projecting laterally inwardly and toward said motor vehicle when it is introduced onto said first tread-boards so that said introducing portions are inserted between the leading wheels of said motor vehicle.

3. The motor vehicle centering system as claimed in claim 1, further comprising a pair of second tread-boards aligned with and positioned adjacent the ends of said first tread-boards opposite the ends where said motor vehicle is introduced and fixedly connected to said wheel guides to support said wheel guides, said second tread-boards being laterally moveably mounted on said frame.

4. The vehicle centering system as claimed in claim 3, wherein said link means comprises:
   a. a center link pivotably mounted at its middle point to said frame on an axis intersecting said center line;
   b. a pair of like second links each having a first end pivotably connected to an individual end of said center link;
   c. a pair of like third links each having a first end pivotably connected to the second end of an individual one of said second links;
   d. a pair of rotatable shafts each fixedly connected to the second end of an individual one of said third links; and
   e. a pair of like fourth links each having its first end fixedly connected to an individual one of said rotatable shafts and its second end pivotably connected to an individual one of said second tread-boards.

5. The motor vehicle centering system as claimed in claim 3, further comprising rails mounted on said frame and extending laterally under each of said second tread-boards, and rollers engaging rotatably with said rails and rotatably secured to said second tread-boards.

6. The motor vehicle centering system as claimed in claim 1, wherein said driving means comprises an air cylinder.

7. The motor vehicle centering system as claimed in claim 1, further comprising rails mounted on said frame and extending laterally under each of said first tread-boards, and rollers engaging rotatably with said rails and rotatably secured to said first tread-boards.

8. The motor vehicle centering system as claimed in claim 7, further comprising spring means connecting each of said first tread-boards to said frame for biasing said first tread-boards toward normal lateral positions.

9. A motor vehicle centering system for centering a motor vehicle having pairs of wheels, comprising:
   a. a stationary frame;
   b. a pair of first tread-boards extending along and on both sides of a center line between said first tread-boards, each of said first tread-boards having a width wider than the width of said wheels, said first tread-boards being separated laterally by a distance corresponding to the approximate lateral distance between said wheels, and said first tread-boards including first rollers rotatably secured to said first tread-boards;
   c. first rails mounted on said frame and extending laterally under each of said first tread-boards, said first rails engaging said first rollers for lateral movement of said first tread-boards relative to said frame;
   d. spring means connecting each of said first tread-boards to said frame for biasing said first tread-boards toward normal lateral positions;
   e. a pair of second tread-boards aligned with and positioned adjacent the ends of said first tread-boards opposite the ends where said motor vehicle is introduced, each of said second tread-boards having a width substantially equal to the width of each of said first tread-boards, and said second tread-boards including second rollers rotatably secured to said second tread-boards;
   f. second rails mounted on said frame and extending laterally under each of said second tread-boards, said second rails engaging said second rollers for lateral movement of said second tread-boards relative to said frame;
   g. a pair of wheel guides each being fixedly attached to an individual one of said second tread-boards and having a free end extending parallel to said center line toward said motor vehicle-introducing end of said first tread-boards, said wheel guides being symmetrically positioned on opposing sides of said center line, and each of said wheel guides including an introducing portion located at said free end of said wheel guide, said introducing portion projecting laterally inwardly and toward said motor vehicle when it is introduced onto said first tread-boards;
   h. link means mounted on said frame for maintaining said second tread-boards symmetrical relative to said center line and allowing said second tread-boards to move symmetrically laterally; and
   i. means for driving said link means to move said second tread-boards and said wheel guides and push said wheels in contact with said first tread-boards to positions symmetrical relative to said center line.

* * * * *